(12) United States Patent
Hayakawa

(10) Patent No.: US 9,077,235 B2
(45) Date of Patent: Jul. 7, 2015

(54) BRUSH MOTOR

(71) Applicant: Yukihiko Hayakawa, Kofu (JP)

(72) Inventor: Yukihiko Hayakawa, Kofu (JP)

(73) Assignee: NISCA CORPORATION, Minamikoma-Gun, Yamanashi-Ken (JP)

(*) Notice: Subject to any disclaimer, the term of this patent is extended or adjusted under 35 U.S.C. 154(b) by 166 days.

(21) Appl. No.: 13/727,170

(22) Filed: Dec. 26, 2012

(65) Prior Publication Data
US 2013/0169107 A1    Jul. 4, 2013

(30) Foreign Application Priority Data

Dec. 28, 2011  (JP) ................................. 2011-287702

(51) Int. Cl.
*H02K 13/10*    (2006.01)
*H01R 39/38*    (2006.01)
*H02K 5/14*     (2006.01)

(52) U.S. Cl.
CPC .............. *H02K 13/10* (2013.01); *H01R 39/381* (2013.01); *H01R 39/385* (2013.01); *H02K 5/148* (2013.01); *H02K 2213/09* (2013.01)

(58) Field of Classification Search
USPC .................. 310/240, 242, 244, 246
See application file for complete search history.

(56) References Cited

U.S. PATENT DOCUMENTS

| | | | | |
|---|---|---|---|---|
| 1,501,558 A | * | 7/1924 | Hunt | 318/250 |
| 1,666,459 A | * | 4/1928 | Leland | 310/167 |
| 1,764,709 A | * | 6/1930 | Anderson | 310/240 |
| 1,855,281 A | * | 4/1932 | Chilton | 290/38 B |
| 2,128,598 A | * | 8/1938 | Williamson | 310/240 |
| 2,475,276 A | * | 7/1949 | Briggs | 310/240 |

FOREIGN PATENT DOCUMENTS

| | | |
|---|---|---|
| JP | 2003-070203 | 3/2003 |
| JP | 2006-094647 | 4/2006 |

* cited by examiner

*Primary Examiner* — Naishadh Desai
(74) *Attorney, Agent, or Firm* — Manabu Kanesaka

(57) ABSTRACT

A brush motor includes a commutator fixed to a shaft, a pair of brushes in a sliding contact with a circumferential surface of the commutator, a first and a second torsion springs respectively pushing and pressing the pair of the brushes to sides of the commutator, a supporting plate attached with the springs, and a screw supporting the supporting plate. The supporting plate 10 is configured to be rotatable about the screw as a center or a supporting position by the screw is capable to be changed, in such a way that the pushing pressures by the springs to the pair of the brushes become to be equalized. Thus, insulation between the brushes can be secured while noise reduction and durability are improved.

11 Claims, 5 Drawing Sheets

$F1 < F2$ $F1 = F2$

BRUSH MOTOR

BACKGROUND OF THE INVENTION

Field of the Invention

1. Technical Field

The present invention relates to a brush motor, and more particularly relates to a brush motor including a commutator fixed to a rotating shaft of the motor, brushes in a sliding contact with the circumferential surface of the commutator, and springs for pushing and pressing the brushes to sides of the commutator.

2. Description of the Related Art

Conventionally, in electric or electronic devices, brush motors have been widely used in each of which brushes are pushed and pressed to commutator sides to conduct a current through a coil so as to perform excitation and switching. In such a brush motor, it has been required to reduce noise and to improve durability along with to improve the output performance. In general, for the noise reduction, a countermeasure to improve the precisions of parts such as mainly, brushes, a commutator and the like has been employed; and for the durability, countermeasures to make the brushes, having a tendency to be worn out, to be larger in size (to make longer), to make a magnet or slots of a core to have multipoles, and the like have been employed.

However, since the brushes are equipped as a pair, even if the precisions of the parts are improved, there is a limit in suppressing the size variation of the pair of the brushes, or in suppressing the variation of the pushing pressures by springs which push the brushes to the commutator sides. Further, with respect to the difference in the wear amounts of the brushes due to the difference of the electric poles for conducting a current through the motor, in general, the wear amount of the negative electric pole side tends to be larger than that of the positive electric pole side, so that the difference in the wear amounts become larger along with the used hours (and accompanied with this, the difference between the pushing pressures by the springs to push the brushes to the sides of the commutator is increased). Still further, the above-mentioned variations are further increased when the motor is used at a high output (high rotation, high torque) or when the number of operations to start up is increased. Accordingly, even the precisions of the parts are improved, there is a problem in that the noise is still generated and the life time is shortened.

In order to cope with such a problem, there is disclosed a technique using a torsion coil spring (hereinafter referred to as a torsion spring) (for example, Japanese Laid Open Patent Publication No. 2003-070203). Further, there is also disclosed a technique for equalizing the pushing pressures (brush pressures) to the pair of the brushes by using a torsion spring (for example, Japanese Laid Open Patent Publication No. 2006-094647).

However, by the above-mentioned conventional techniques, since the structure has a single torsion spring having both sides with extending portions to push the pair of the (two) brushes, while the structure becomes simple and the number of parts is reduced, it is difficult to select the material of the torsion spring so as not to cause to conduct a current (short circuit) between the two brushes. In order to avoid such a conduction of a current, it has been proposed to provide insulating coating on the tip portions of the extending portions, however, when deposition and adhesion of conductive powders of the brushes floating within an exterior case are taken into consideration, there is a risk in that the insulation quality between the two brushes becomes unstable.

In view of the above circumstances, an object of the present invention is to provide a brush motor with secured insulation while noise is reduced and durability is improved.

SUMMARY OF THE INVENTION

According to the present invention, there is provided a brush motor including a commutator fixed to a rotating shaft of the motor, a pair of brushes in a sliding contact with a circumferential surface of the commutator, a first and a second springs respectively pushing and pressing the pair of the brushes to sides of the commutator, a spring attaching member attached with the first and the second springs, and a supporting member supporting the spring attaching member, wherein the spring attaching member is configured to be rotatable about the supporting member as a center or a supporting position by the supporting member is capable to be changed, in such a way that the pushing pressures by the first and the second springs to the pair of the brushes become to be equalized. With this, the pushing pressures by the first and the second springs to the pair of the brushes are equalized so that noise reduction can be realized as well as durability can be improved because the pushing pressures are equalized so that the difference between the wear amounts of the pair of the brushes disappears, and insulation between the pair of the brushes can be secured because the material of the spring attaching member is resin, and the first and the second springs are attached to the spring attaching member.

DESCRIPTION OF THE PREFERRED EMBODIMENTS

In the following, an explanation will be given about a brush motor according to an embodiment applicable to the present invention with reference to the drawings.

Figure 1:
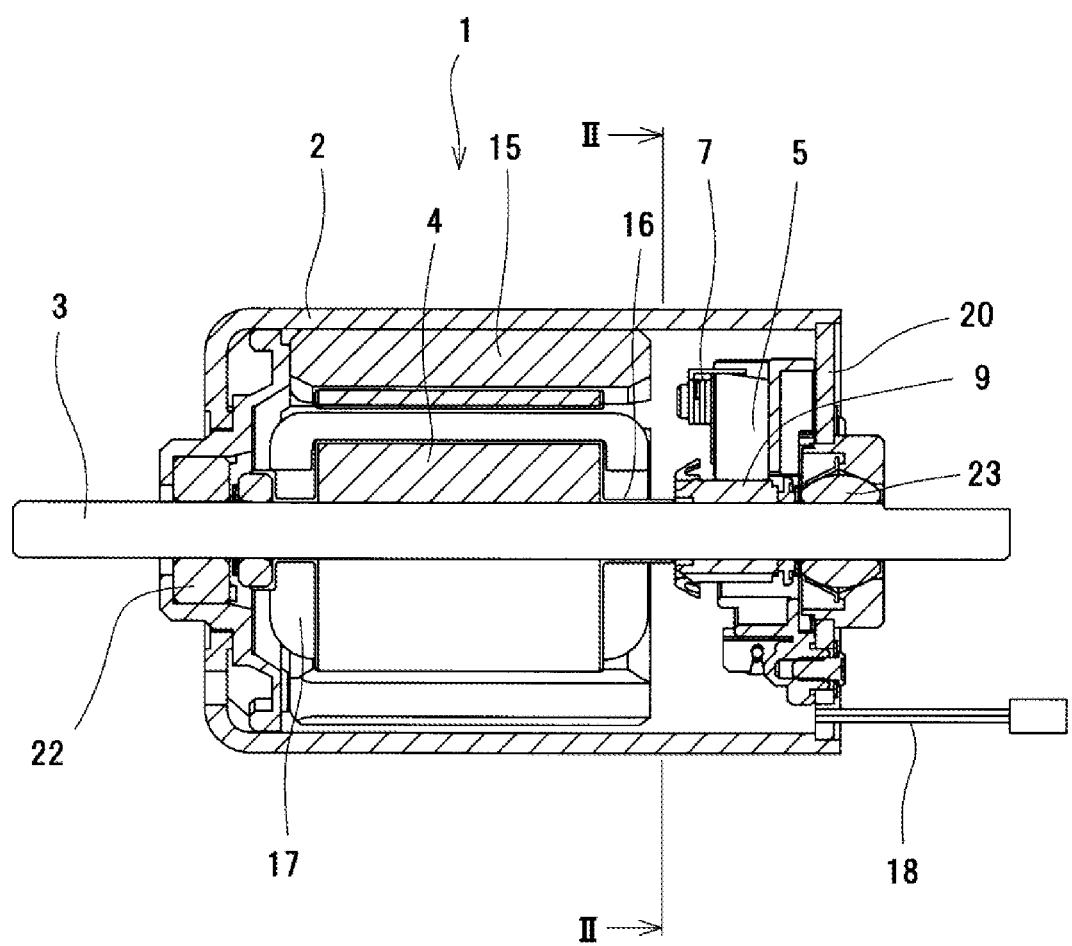
FIG. 1 is a sectional view of a brush motor in a longitudinal direction according to an embodiment applicable to the present invention.

As shown in FIG. 1, a brush motor 1 according to the present embodiment includes a shaft 3 as a rotating shaft of the motor. In the present embodiment, one side (right side in FIG. 1) of the shaft 3 is shown to be cut away and shown as an output side, however, it may also be possible to make the other side (left side in FIG. 1) to be an output side.

At a position to the left including a central portion in the longitudinal direction of the shaft 3, a cylindrical iron core (core) 4, which becomes to be magnetic flux paths, is fixed. Around the circumference of the iron core 4, a plurality of slots (core slots) is formed along the longitudinal direction. In these slots, a winding (a coil) 17 is wound a number of times. Due to this, the both sides of the iron core 4 have a structure to be filled with the winding 17. Note that, between the iron core 4 and the coil 17, an insulating layer (placo) 16 is interposed to keep insulation therebetween. As the material of the insulating layer 16, epoxy resin is used for example.

Further, to the shaft 3, at a position slightly separated from the winding 17 arranged at the one side (the right side in FIG. 1) of the iron core 4, a commutator 9 for switching the direction and the phase of the current passing through the winding 17 is fixed. In the present embodiment, the commutator 9 includes six divided pieces (see FIG. 2). Note that, at a side of the commutator 9 close to the iron core 4, a connecting portion for connecting with the winding 17 is provided.

Accordingly, in the brush motor 1, a rotor is constructed by the shaft 3, the iron core 4, the winding 17, the insulating layer 16, and the commutator 9. On the other hand, a stator side is constructed as follows.

At a position separated from the iron core 4, there are provided magnets (permanent magnets) 15 each having an arc-like cross section and generating magnetic fluxes necessary to generate torque of the motor. The magnets 15 are fixed at insides of a case 2. Note that, in this embodiment, four magnets each having magnetized N and S poles are used.

The case 2 is formed by performing deep-drawing processing on a steel plate to form a cylindrical shape having a bottom. At a central portion of the bottom side (the left side in FIG. 1), a circular hole for inserting the shaft 3 is formed. The reason why the steel plate is used for the case 2 is to form paths of the generated magnetic fluxes and to prevent the magnetic fluxes from leaking to the outside of the motor.

The opening side of the case 2 is sealed by a disk-like bracket 20. At the central portion of the bracket 20, a circular hole for inserting the shaft 3 is formed. As the material of the bracket 20, steel plate is used just like the case 2. Note that, in the present embodiment, the case 2 and the bracket 20 construct an exterior case of the brush motor 1.

In the circular hole formed at the central portion of the bottom side of the case 2 and in the circular hole formed at the central portion of the bracket 20, bearings 22 and 23 are respectively fixed for supporting the shaft. The shaft 3 rotates while it is in a sliding contact with the bearings 22 and 23.

Figure 2:
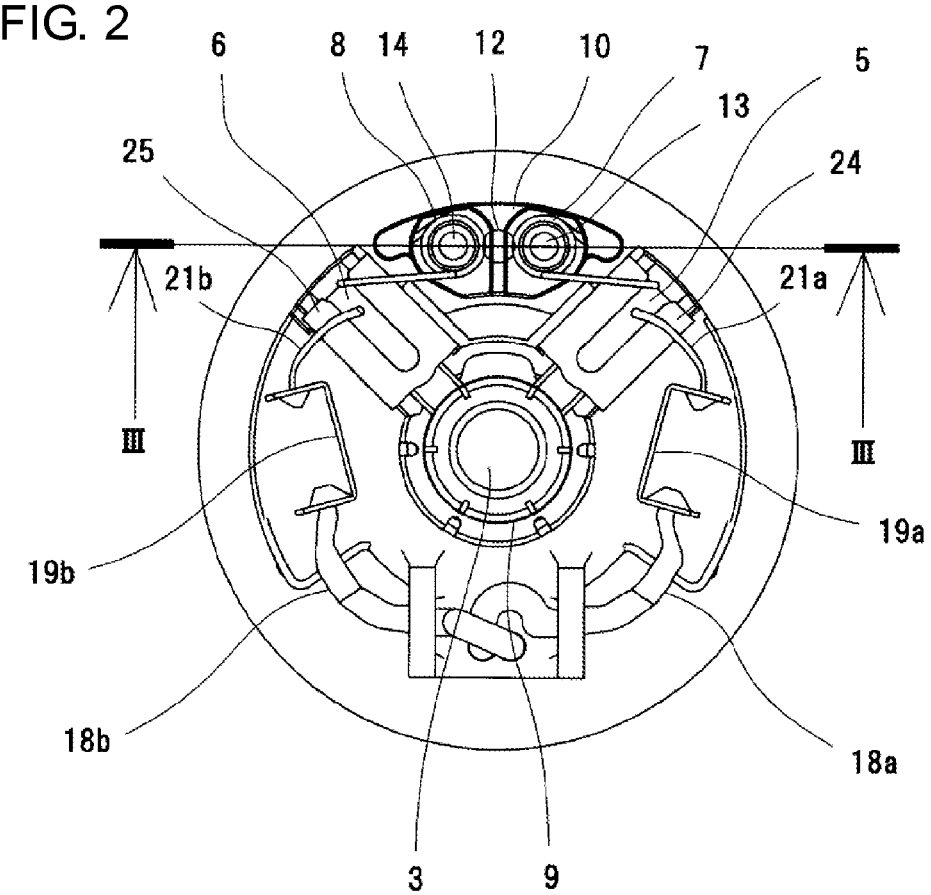
FIG. 2 is a front view of a brush supporting configuration of the brush motor according to the embodiment when viewed from a line II-II in FIG. 1.

As shown in FIG. 1 and FIG. 2, one end portion of each of a first brush 5 and a second brush 6 (a pair of brushes) is pushed to be in contact with a circumferential surface of the commutator 9. The main material of the first brush 5 and the second brush 6 is black lead. These pair brushes have structures to make a sliding contact with the circumferential surface of the commutator 9. The brushes 5 and 6 are accommodated in brush cases 24 and 25 in such a way that one end of each of the brushes 5 and 6 orthogonally abuts the circumferential surface of the commutator 9. Note that, in the present embodiment, the brush cases 24 and 25 are arranged in such a way that the axial directions of the brushes 5 and 6 form an angle of 90° (are orthogonal). Further, in manufacturing the brushes 5 and 6, the same things are used (material, lengths, and the like are the same).

Figure 3:
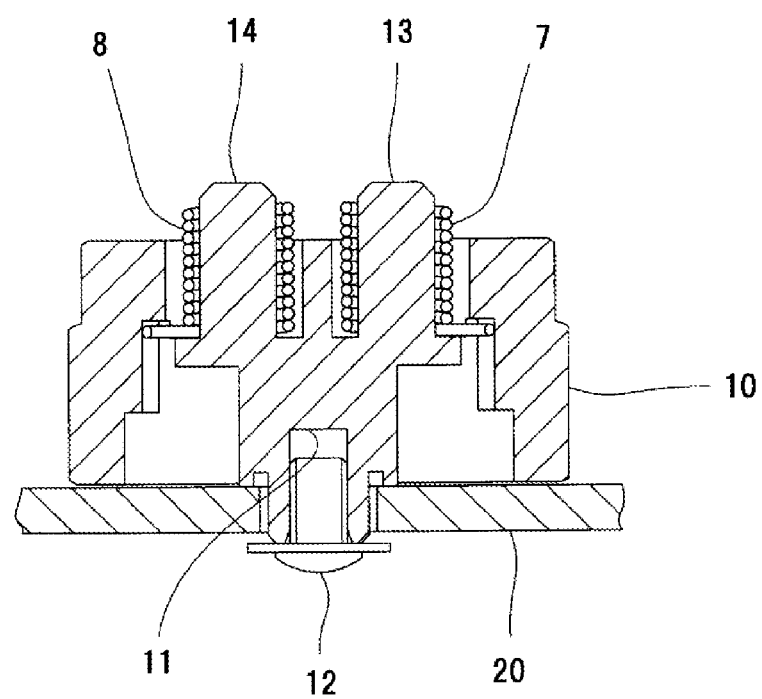
FIG. 3 is a sectional view of a supporting plate when viewed from a line III-III in FIG. 2.

Between the brushes 5 and 6, a supporting plate 10 made of resin is arranged. A first torsion spring 7 and a second torsion spring 8 are attached to the supporting plate 10. In the present embodiment, the supporting plate 10 has a generally fan-like shape and is constructed by a plate member, however, the present invention is not limited to this. As shown in FIG. 3, positioning projections 13 and 14 having cylindrical shapes are provided in a protruding condition by protruding from the supporting plate 10 to the side of the magnet 15 (see FIG. 1 also) and by inserting into coil portions of the torsion springs 7 and 8. Further, in the supporting plate 10, latching portions (spaces) for latching the respective ends of the torsion springs 7 and 8 are formed.

As shown in FIG. 2, the other ends of the torsion springs 7 and 8 respectively abut (contact by pressure) the other ends of the brushes 5 and 6 in such a way that the other ends of the torsion springs 7 and 8 respectively push and press the other ends of the brushes 5 and 6. Note that the above-mentioned brush cases 24 and 25 are configured to have notches in their longitudinal directions so that the contact by pressure against the other ends of the brushes 5 and 6 by the other ends of the torsion springs 7 and 8 is continuously kept even when the brushes 5 and 6 are worn out.

As shown in FIG. 2 and FIG. 3, a slot (circular hole) 11 is formed in the central portion of the supporting plate 10. A tip section of a screw 12 is inserted into the slot 11. The screw 12 has a head with a seat which abuts an outer side of the bracket 20. The screw 12 is a supporting member having a thread part screwing together with a female screw which is threadably mounted on the bracket 20. In the present embodiment, the position of the slot 11 is formed to coincide, on a plane, with the center of gravity of the supporting plate 10 after attaching the torsion springs 7 and 8 to it. Further, the screw 12 is provided at a position separated by the same distance from the brush cases 24 and 25 which accommodate the brushes 5 and 6, and more specifically, from the axis lines of the brushes 5 and 6. Accordingly, the supporting plate 10 is configured to be supported by the screw 12 as an axis and to be rotated about the screw 12 as a center.

Figure 4A:
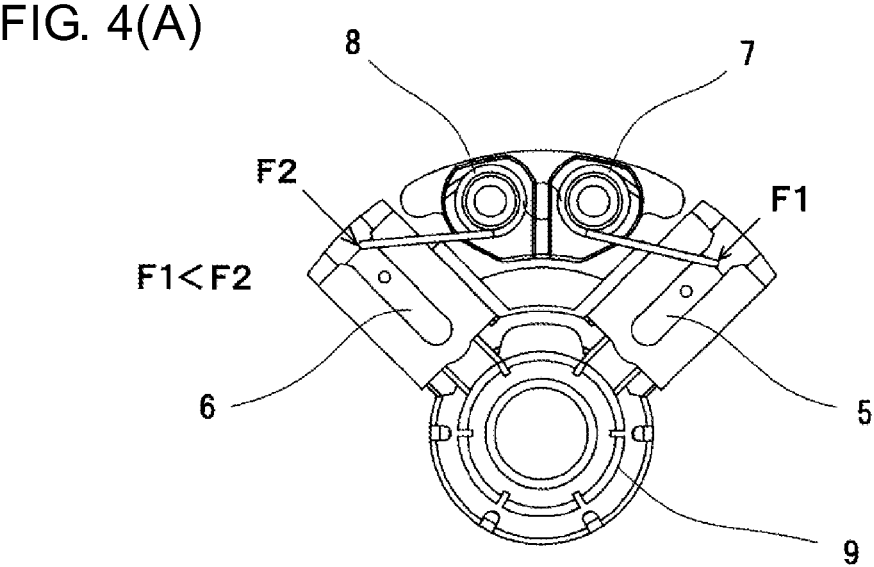
FIG. 4 shows front views illustrating the relationship between brushes and torsion springs, wherein (A) shows a state when the wears of the first and the second brushes are not equal; (B) shows a state when the supporting plate rotates in such a way that the first and the second torsion springs keep a balance of the spring pressures for pushing and pressing the first and the second brushes; and (C) shows a state when the wears of the first and the second brushes are equalized.

That is, as shown in FIG. 4(A), when wear levels of the brushes 5 and 6 become uneven, a difference is generated between the pushing pressure (biasing force) F1 by the first torsion spring 7 to the first brush 5 and the pushing pressure F2 by the second torsion spring 8 to the second brush 6. As described in the column of the description of the related art, when the first brush 5 is connected to a negative electric pole side of a power supply, and the second brush 6 is connected to a positive electric pole side, in general, the wear level of the first brush becomes larger with time than the wear level of the second brush 6 (the first brush 5 becomes shorter than the second brush 6), so that the pushing pressure F2 becomes larger than the pushing pressure F1.

Figure 4B:
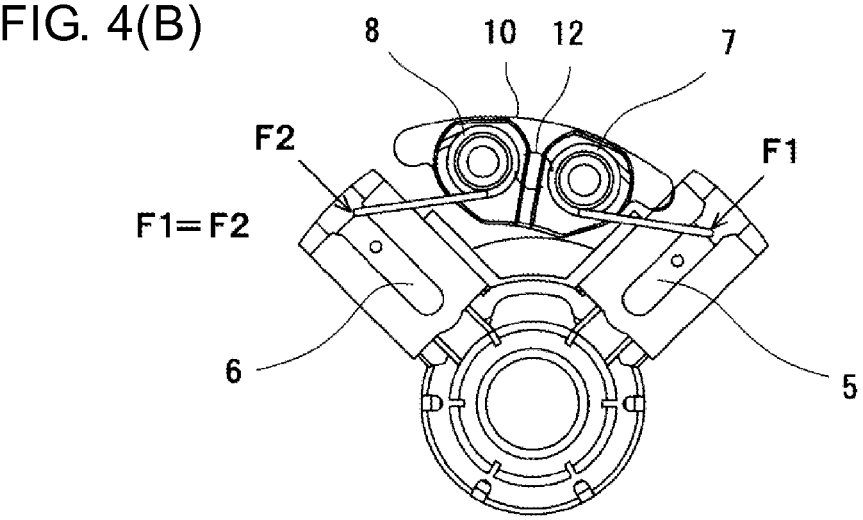

In that case, in the present embodiment, as shown in FIG. 4(B), the supporting plate 10 rotates around the screw 12 as a rotating center so as to balance the pushing pressure F1 with the pushing pressure F2 (so as to make the pushing pressures F1 and F2 to be equalized). This principle will be described later (see "mechanism for automatically adjusting brush pressures").

As shown in FIG. 1 and FIG. 2, the brush motor 1 includes lead wires 18 to be connected to the power supply. The lead wires are configured by a lead wire 18a to be connected to the negative side of the power supply, and a lead wire 18b to be connected to the positive side of the power supply. At the ends of the lead wires 18, connectors for connecting the motor to the power supply are provided. Note that the lead wires 18 are accommodated in the exterior case through a hole formed in the bracket 20.

That is, the lead 18a is connected to one side of a connecting piece 19a made of metal and having a cross section with a U-shaped, while the other end of the connecting piece 19a is connected through a connecting lead wire 21a to the brush 5. Similarly, the lead 18b is connected to one side of a connecting piece 19b made of metal and having a cross section with a U-shaped, while the other end of the connecting piece 19b is connected through a connecting lead wire 21b to the brush 6.

Figure 6A:
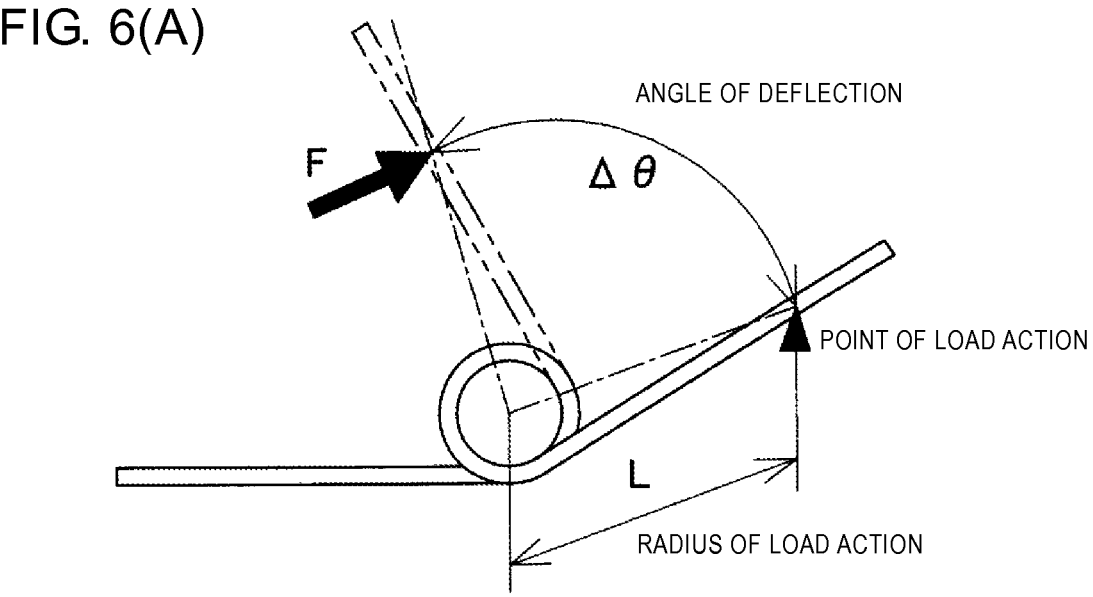
FIG. 6 shows explanatory diagrams of torsion springs wherein (A) is an explanatory diagram with respect to the relationship among loads, angles of deflections, and radiuses of load actions, of the torsion springs; and (B) is an explanatory diagram of the pushing pressures, the angles of deflections and spring constants, of the first and the second torsion springs.
Figure 6B:
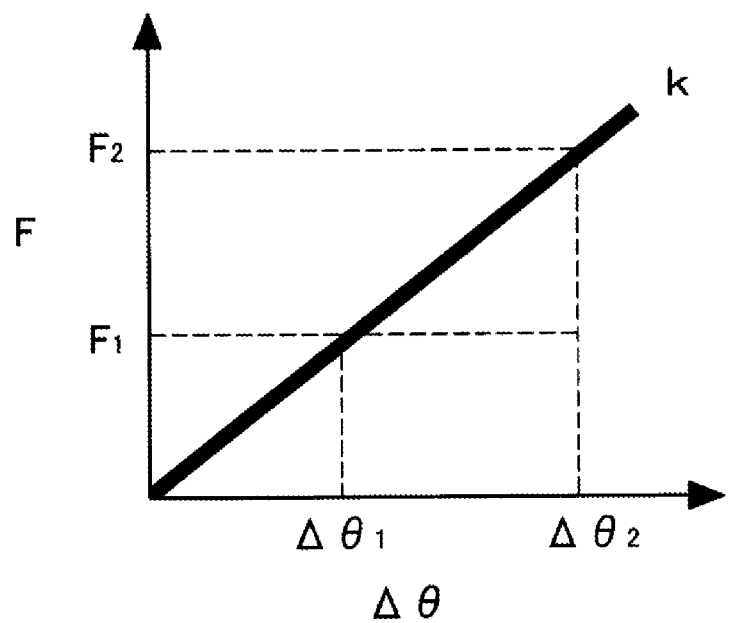

As shown in FIG. 6(A), when the spring constant is expressed by K, the angle of deflection is expressed by $\Delta\theta$, and the radius of load action from the center of the coil portion to the point of load action is expressed by L, then, a load F by the torsion springs is expressed as: load $F(N)$=spring constant k×angle of deflection $\Delta\theta$ (deg)÷radius of load action L.

In the present embodiment, as mentioned above, the torsion springs 7 and 8 are made by the same members and therefore in a state when the wears of the brushes 5 and 6 become uneven, a difference is generated between the pushing pressure (load) F1 by the first torsion spring 7 to the first brush 5 and the pushing pressure F2 by the second torsion spring 8 to the second brush 6. That is, with respect to the angle of deflection $\Delta\theta1$ of the first torsion spring 7 and the angle of deflection $\Delta\theta2$ of the second torsion spring 8, an expression expressed by $\Delta\theta2 > \Delta\theta1$ . . . formula (1) is established. Further, with respect to the pushing pressures F1 and F2, the angles of deflections $\Delta\theta1$ and $\Delta\theta2$, and the spring constant k, a relation (F1<F2) is established as shown in FIG. 4(A).

Figure 5:
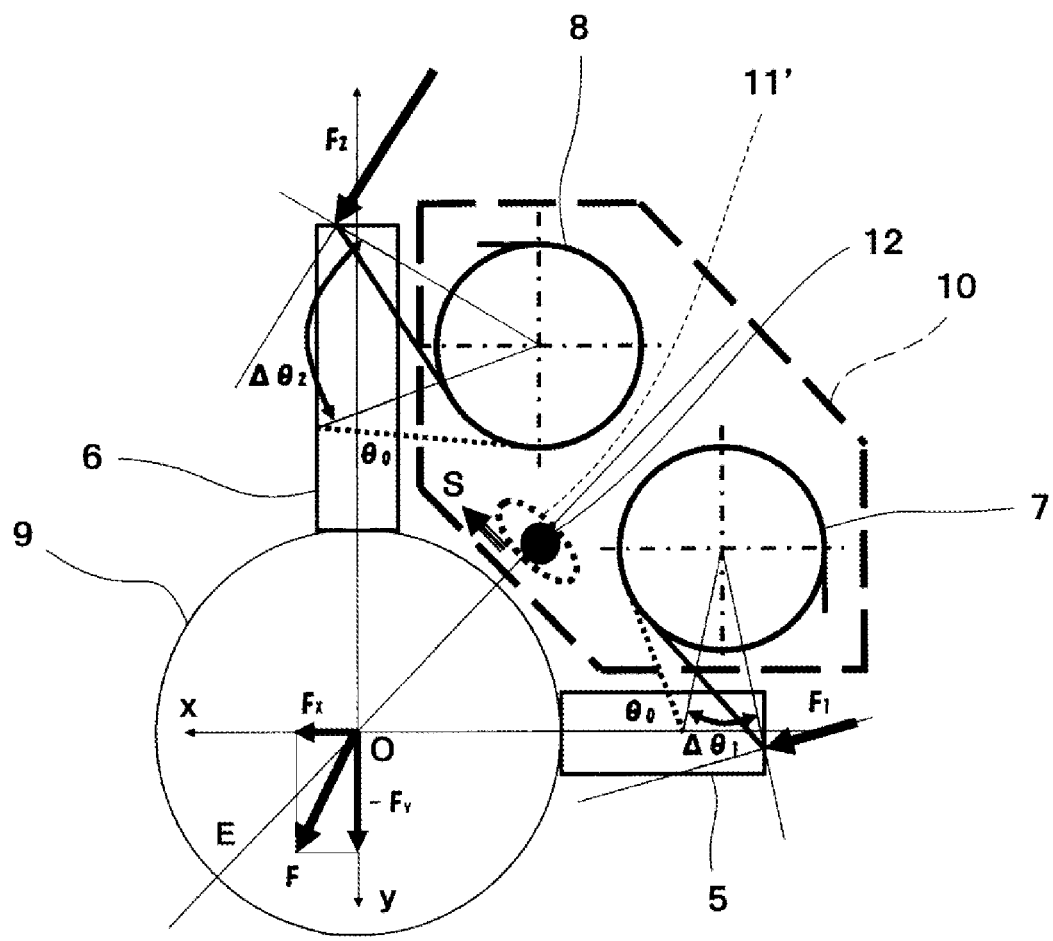
FIG. 5 is an explanatory diagram showing the operating principle of a mechanism for automatically adjusting the brush pressures.

Based on the above, FIG. 5 schematically shows the state shown in FIG. 4(A), wherein the axis line of the first brush 5 is arranged on the x axis, and the axis line of the second brush 6 is arranged on the y axis. Note that, in FIG. 5, in order to explain the principle of the mechanism for automatically adjusting brush pressures in an easily understood way, a long hole 11' is shown instead of the slot 11, and $\theta0$ represents a position at which the angle of deflection is 0°.

The x and y components of the pushing pressure F1 by the first torsion spring 7 to the first brush 5 and the pushing pressure F2 by the second torsion spring 8 to the second brush 6 are respectively expressed as the following formulas (2)-(5). Note that, in the following formulas (2)-(5), the one with an added suffix "x", such as for example $F1x$, represents an x component of the pushing pressure F1, and the one with an added suffix "y", such as for example $F2y$, represents a y component of the pushing pressure F2.

$$F1x = |F1| \cos \Delta\theta1 \quad \text{formula (2)}$$

$$-F1y = |F1| \sin \Delta\theta1 \quad \text{formula (3)}$$

$$F2x = |F2| \sin \Delta\theta2 \quad \text{formula (4)}$$

$$-F2y = |F2| \cos \Delta\theta2 \quad \text{formula (5)}$$

From the formulas (2)-(5), the absolute value $|Fx|$ which is the x direction component and the absolute value $|Fy|$ which is the y direction component, of the pushing pressures F1 and F2, at a center O of the shaft 3, are respectively expressed by the following formulas.

$$|Fx| = F1x + F2x = |F1| \cos \Delta\theta1 + |F2| \sin \Delta\theta2$$

$$|Fy| = F1y + F2y = |F1| \sin \Delta\theta1 + |F2| \cos \Delta\theta2$$

From the formula (1) and the relation (F1<F2) shown in FIG. 4(B), a result $|Fy| > |Fx|$ is obtained, and the direction of action of the synthesized pushing pressure of the pushing pressures F1 and F2 at the axis O of the shaft 3 is represented by F shown in FIG. 5.

On the other hand, when the wears of the brushes 5 and 6 are even, the absolute values of the pushing pressure F1 by the first torsion spring 7 to the first brush 5 and the pushing pressure F2 by the second torsion spring 8 to the second brush 6 become the same, so that the direction of action of the synthesized pushing pressure of the pushing pressures F1 and F2 at the axis O of the shaft 3 is the direction on a line E which has the same angle (respectively of 45°) from the x axis and y axis. The screw 12 is positioned on an extended line of this direction. In another words, the position of the screw 12 is set in such a way that the length of a foot of a perpendicular from the axis of the screw 12 to the x axis becomes the same as the length of a foot of a perpendicular from the axis of the screw 12 to the y axis, that is, the position of the screw 12 is set in such a way that the distances from the axis lines of the pair of the brushes to the screw 12 become the same.

By a reaction force of the above-mentioned synthesized pushing pressure, the supporting plate 10 moves along the long hole 11' in the direction of an arrow S shown in FIG. 5. Thereby, the angle of deflection $\Delta\theta2$ of the second torsion spring 8 is decreased, and the angle of deflection $\Delta\theta1$ of the first torsion spring 7 is increased, resulting in a stable state when a balance of the reaction forces is established. In other words, the direction of the action by the synthesized pushing pressure of the pushing pressures F1 and F2 at the axis O of the shaft 3 is the direction which has the same angle from the x axis and the y axis. Accordingly, by the mechanism for automatically adjusting brush pressures, adjustment is performed in such a way that the pushing pressure F1 by the first torsion spring 7 to the first brush 5 and the pushing pressure F2 by the second torsion spring 8 to the second brush 6 become equal. Note that, in the example shown in FIG. 5, the long hole 11' is formed in the direction intersecting with the above-mentioned line E on the supporting plate 10.

Figure 4C:
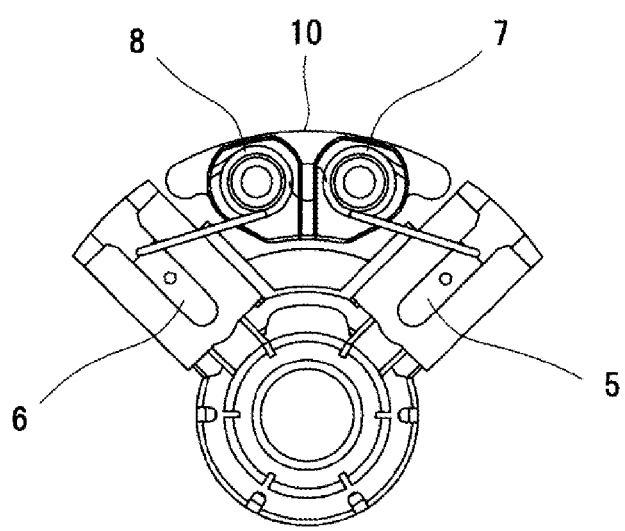

In the above explanation, an example has been shown in which balancing is kept by moving the supporting plate 10 in the direction indicated by the arrow S with reference to the screw 12 inserted into the long hole 11' which is formed in the supporting plate 10, so that it is possible to change the supporting position by the screw 12, however, in place of this, in the above-described embodiment, balancing is kept by rotating the supporting plate 10 about the screw 12 which is inserted into the slot (circular hole) 11 formed in the supporting plate 10 to support, as an axis, the supporting plate 10. FIG. 4(C) shows a state in which the wear amounts of the first brush 5 and the second brush 6 are equalized by the mechanism for automatically adjusting brush pressures according to the present embodiment.

Next, the function effects or the like of the brush motor 1 according to the present embodiment will be explained.

Since the brush motor 1 according to the present embodiment is configured in such a way that the supporting plate 10 is rotatable with the screw 12 as its center (FIG. 4) or the supporting position by the screw 12 can be changed (FIG. 5) (since it has the mechanism for automatically adjusting the brush pressers), the pushing pressures by the two torsion springs 7 and 8 to the pair of the brushes 5 and 6 can be equalized so that noise reduction can be realized. Further, since the pushing pressures by the torsion springs 7 and 8 are equalized, the difference between the wear amounts of the pair of the brushes 5 and 6 disappears, resulting in an improvement in durability. Still further, since the material of the supporting plate 10 is resin and the two torsion springs 7 and 8 are separately attached to the supporting plate 10, insulation between the pair of the brushes 5 and 6 can be secured.

Still further, in the brush motor 1 according to the present invention, since the supporting plate 10 is arranged between the pair of the brushes 5 and 6, the lengths of the other ends of the torsion springs 7 and 8 for pushing the brushes 5 and 6 can be shortened, and accordingly, the mechanism for automatically adjusting the brush pressure can be downsized.

Still further, in the brush motor 1 according to the present invention, since the screw 12 is fixed (attached) to the bracket 20 which constitutes the exterior case, and is inserted, from the side of the bracket 20, into the slot 11 formed in the supporting plate 10, the assembling becomes easy and the number of assembling man-hours can be reduced.

Still further, in the brush motor 1 according to the present embodiment, since the positioning projections 13 and 14, which are inserted into the coil portions of the torsion springs 7 and 8, are provided on the supporting plate 10 in a protruding condition, even when the reaction forces from the brushes 5 and 6 are acted by the above-described mechanism for automatically adjusting the brush pressure, the torsion springs 7 and 8 can fulfill the essential function of the spring without buckling.

Note that, in the present embodiment, the supporting plate 10 has been shown as a fan-shaped member as an example, however, the present invention is not limited to this. For example, it may be constructed by two members for attaching the torsion springs 7 and 8 and a connecting member for connecting these two members, and the slot 11 may be formed in the connecting member. In this case, in order to secure the strength of the connecting member, the vicinity of the position for forming the slot may be made to be large. Accordingly, the member for attaching the springs is not limited also to the one having plate geometry.

Still further, in the present embodiment, the supporting member has been shown by the screw 12 as an example, however, the present invention is not limited to this but, for example, it may be a member having a shape of a pin. Still further, in the present embodiment, the supporting plate 10 (a spring attaching member) and the screw 12 (a supporting member) have been shown as different things as an example, however, the spring attaching member and the supporting member may be made as a one body, and the supporting member may be inserted into the exterior case, into a portion extended from the exterior case to the inside of the exterior case, into a slot or the like of an another member fixed to the exterior case so as to be supported by an axis. Still further, in the present embodiment, an example has been shown in which the screw 12 is inserted into the slot 11, however, as has been shown in FIG. 5 also, the screw may pass through the slot or the long hole.

Still further, in the present embodiment, an example has been shown in which the screw 12 is arranged at the position of the center of gravity of the supporting plate 10, however, as has been shown in FIG. 5 also, the present invention is not limited to this. In such a configuration, in order to prevent fluctuations of the supporting plate (for example, a fact that the supporting plate moves in such a way that the heights, in the direction perpendicular to the paper, of the upper right and the lower left of the supporting member become different), it may be possible to provide a fluctuation suppressing member. As such a fluctuation suppressing member, a guide member or a member having a pin or screw shape may be used. In case the screw 12 is arranged at the position of the center of gravity to the supporting plate 10 as in the present embodiment also, if necessary, the fluctuation suppressing member may be provided.

Still further, in the present embodiment, an example has been shown in which, as springs to push and press the brushes 5 and 6, the torsion springs are used, however, the present invention is not limited to this, but for example, plate springs or spiral springs may be used.

This application claims priority from Japanese Patent Application No. 2011-287702 filed on Dec. 28, 2011.

The invention claimed is:

1. A brush motor, comprising;
   a commutator fixed to a rotating shaft,
   a pair of brushes in a sliding contact with a circumferential surface of the commutator,
   a first and a second springs respectively pushing and pressing the pair of the brushes to sides of the commutator,
   one spring attaching member attached with the first and the second springs,
   a pair of brush cases fixed separately from the spring attaching member, accommodating the pair of brushes such that an end of each of the pair of brushes contacts the circumferential surface of the commutator at a right angle, and
   a supporting member supporting the one spring attaching member,
   wherein the one spring attaching member is rotatable about the supporting member as a center thereof or a supporting position by the supporting member is capable to be changed, in such a way that pushing pressures by the first and the second springs to the pair of the brushes are equalized.

2. The brush motor as claimed in claim 1, wherein the spring attaching member is arranged between the pair of the brushes.

3. The brush motor as claimed in claim 2, wherein the supporting member is arranged at a position for a same distance away from axis lines of the pair of the brushes.

4. The brush motor as claimed in claim 1, wherein the spring attaching member is supported by the supporting member as an axis and rotates about the supporting member as a center.

5. The brush motor as claimed in claim 1, wherein the supporting member is a screw or a pin-shaped member, and
   a slot is formed to insert the screw or the pin-shaped member therethrough.

6. The brush motor as claimed in claim 1, wherein the first and second springs are first and second torsion springs respectively,
   one end of each of the first and second torsion springs is fixed to the spring attaching member, and
   other end of each of the first and second torsion springs pushes and presses the brushes.

7. The brush motor as claimed in claim 6, wherein the spring attaching member comprises projections inserted into coil portions of the torsion springs.

8. A brush motor, comprising:
   a rotating shaft;
   a cylindrical case having a bottom;
   a bracket which is in a disk-shape and seals an open part of the case;
   a commutator disposed in the case and fixed on the rotating shaft;
   a pair of brushes slidably contacting a circumferential surface of the commutator;
   a first spring and a second spring pushing and pressing each of the pair of brushes towards the commutator;
   one spring attaching member attached with the first spring and the second spring;

a pair of brush cases accommodating the pair of brushes such that an end of each of the pair of brushes contacts the circumferential surface of the commutator at a right angle; and a supporting member disposed on the bracket, and supporting the one spring attaching member in an inner side of the bracket, wherein the one spring attaching member is rotatable about the supporting member as a center thereof or a supporting position by the supporting member is capable to be changed, in such a way that pushing pressures by the first spring and the second spring to the pair of the brushes are equalized.

9. The brush motor according to claim 8, wherein the supporting member is a screw or a pin-shaped member protruding towards the inner side of the bracket, the one spring attaching member has a slot through which the screw or the pin-shaped member is inserted, and the one spring attaching member is supported in the inner side of the bracket.

10. The brush motor according to claim 8, wherein the commutator, the pair of brushes, the first spring, the second spring, and the pair of brush cases are disposed in the inner side of the bracket.

11. The brush motor according to claim 1, wherein the one spring attaching member includes an elongated slot supported by a pin-shaped member as the supporting member such that the pushing pressures by the first and second springs to the pair of brushes are equally applied onto the commutator, the pushing pressures by the first and second springs being only pressures applied onto the commutator.

* * * * *